(12) United States Patent
Osman

(10) Patent No.: US 10,951,951 B2
(45) Date of Patent: Mar. 16, 2021

(54) HAPTICS METADATA IN A SPECTATING STREAM

(71) Applicant: Sony Interactive Entertainment Inc., Tokyo (JP)

(72) Inventor: Steven Osman, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 51 days.

(21) Appl. No.: 16/525,988

(22) Filed: Jul. 30, 2019

(65) Prior Publication Data

US 2021/0037288 A1 Feb. 4, 2021

(51) Int. Cl.
*H04N 21/4722* (2011.01)
*A63F 13/285* (2014.01)
*A63F 13/355* (2014.01)
*H04N 21/432* (2011.01)

(52) U.S. Cl.
CPC ....... *H04N 21/4722* (2013.01); *A63F 13/285* (2014.09); *A63F 13/355* (2014.09); *H04N 21/4325* (2013.01)

(58) Field of Classification Search
None
See application file for complete search history.

(56) References Cited

U.S. PATENT DOCUMENTS

| | | | | |
|---|---|---|---|---|
| 8,754,757 B1 * | 6/2014 | Ullrich | ..................... | G08B 6/00 340/407.1 |
| 10,156,908 B2 | 12/2018 | Stafford et al. | | |
| 10,258,712 B2 | 4/2019 | Becker et al. | | |
| 2003/0076298 A1 * | 4/2003 | Rosenberg | ......... | G06K 9/00013 345/156 |
| 2004/0101447 A1 * | 5/2004 | Tajima | .................. | A61M 21/00 422/123 |
| 2006/0139312 A1 | 6/2006 | Sinclair et al. | | |
| 2007/0126927 A1 | 6/2007 | Yun et al. | | |
| 2008/0117166 A1 * | 5/2008 | Rosenberg | .............. | G06F 21/32 345/156 |
| 2009/0049092 A1 * | 2/2009 | Capio | .................. | H04N 21/235 |
| 2009/0055742 A1 | 2/2009 | Nordhagen | | |

(Continued)

FOREIGN PATENT DOCUMENTS

EP 2846221 A1 * 3/2015 ............... G08B 6/00

OTHER PUBLICATIONS

Wanick et al., "Virtual transendence experiences: Exploring technical and design challenges in multi-sensory environments.", In: Proceedings of the 10th International Workshop on on Immersive Mixed and Virtual Environment Systems. Jun. 15, 2018. Retrieved from https://www.researchgate.net/publication/325920751_Virtual_Transcendence_Experiences_Exploring_Technical_and_Design_Challenges_in_Multi-Sensory_Environments.

(Continued)

*Primary Examiner* — Fernando Alcon
(74) *Attorney, Agent, or Firm* — John L. Rogitz

(57) ABSTRACT

Metadata indicating demanded haptic events during playback of an audio video (AV) stream is embedded with the AV stream, such that the metadata can be extracted during AV playback and rendered on the player's side as demanded. In this way, previously recorded video can be spectated during playback without losing whatever haptic experiences may have been generated for original playback without having to rely on merely deriving haptic events from audio.

16 Claims, 7 Drawing Sheets

(56) References Cited

U.S. PATENT DOCUMENTS

| | | | |
|---|---|---|---|
| 2009/0069081 A1* | 3/2009 | Thorner | A63F 13/285 |
| | | | 463/30 |
| 2010/0150530 A1* | 6/2010 | Zalewski | G11B 27/105 |
| | | | 386/241 |
| 2010/0268745 A1 | 10/2010 | Choi et al. | |
| 2014/0267911 A1 | 9/2014 | Grant et al. | |
| 2014/0347177 A1* | 11/2014 | Phan | H04N 21/816 |
| | | | 340/407.1 |
| 2015/0015607 A1 | 1/2015 | Sodhi et al. | |
| 2015/0070147 A1 | 3/2015 | Cruz-Hernandez et al. | |
| 2016/0175703 A1* | 6/2016 | Venkatesan | A63F 13/218 |
| | | | 463/37 |
| 2017/0206755 A1* | 7/2017 | Levesque | G06F 3/167 |
| 2017/0332162 A1 | 11/2017 | Lin et al. | |
| 2018/0227063 A1* | 8/2018 | Heubel | G06F 3/016 |
| 2019/0105562 A1* | 4/2019 | Grant | A63F 13/211 |

OTHER PUBLICATIONS

International Search Report and Written Opinion dated Sep. 21, 2020 from the counterpart PCT application PCT/US20/40841.

\* cited by examiner

HAPTICS METADATA IN A SPECTATING STREAM

FIELD

The application relates generally to technically inventive, non-routine solutions that are necessarily rooted in computer technology and that produce concrete technical improvements. In particular, the present application relates to haptics metadata in a spectating stream.

BACKGROUND

Audio and video are encoded for streams used to broadcast gameplay.

SUMMARY

As understood herein, audio and video are not the only outputs of computer simulation consoles. In particular, computer simulation consoles also output haptic generator commands to cause haptic generators on, e.g., computer simulation headsets or elsewhere in the gaming environment to activate tactile signals to the player. Present principles encode information regarding haptic events into metadata that is sent for re-rendering on the player's side.

Note that the additional haptics metadata may be transmitted as an external stream from the AV stream, and not necessarily as an embedded stream in the AV stream. Or, the haptics metadata may be transmitted in other ways, for instance through a Blu-Ray disc, not necessarily through a network device. The haptics metadata may be transmitted completely separately from the A/V stream. The haptics metadata may include tactile information and other sensory information that is supplemental to the related audio video stream such as taste information, scent information, temperature information, wind information, magnetic field information, acceleration information, and moisture information, without limitation. The haptic information may be remapped to audio and video as well, in that recognizing that some people may not wish for haptic experiences, indications of such experiences may be audible and/or visibly displayed. Present principles may be implemented by an A/V device or a non-AV device. For instance, a game controller could retrieve haptic data and sync it to a separate A/V device independently of the A/V device itself. It could even have a camera or a microphone which observes the A/V device to do the time synchronization so the A/V device can be a completely unmodified A/V device. Additional haptic streams may be negotiated (or unlocked) according to other criteria, such as additional payment. The streams could be embedded but encrypted (i.e. DRM), or rights could be negotiated with the server.

Accordingly, a device includes at least one computer memory that is not a transitory signal and that in turn includes instructions executable by at least one processor to associate metadata with non-audio, non-video sensory generation information. The instructions are executable to embed the metadata in packets of an audio video (AV) stream such that the AV stream can be recorded along with the metadata and played back to cause a play back apparatus to use the metadata to retrieve the associated non-audio, non-video sensory generation information and generate sensory signals as demanded by the non-audio, non-video sensory generation information during play back of the AV stream.

The device may be implemented by at least one network server. Or, the device can be implemented by a device in a local area network with the playback device.

The non-audio, non-video sensory generation information includes one or more of haptic information, scent information, and taste information.

In example embodiments, the instructions may be executable to identify the non-audio, non-video sensory generation information based on capability information received from the playback device. In some implementations the instructions may be executable to receive accessibility information associated with the playback device, and responsive to the accessibility information, remap first non-audio, non-video sensory generation information to second sensory generation information for playback of sensory signals as demanded by the second sensory generation information, in which case the metadata is associated with the second sensory generation information. This second sensory information can include audio and video, because some people who are sensitive to haptics may want to see a close-captioned version of video indicating a haptic event, e.g., "rumble" on screen, which would be a visual representation of the haptic event in this case.

In non-limiting embodiments the instructions are executable to provide first metadata corresponding to first non-audio, non-video sensory generation information in the AV stream for playback of non-audio, non-video sensory signals demanded by the first non-audio, non-video sensory generation information on a first device associated with a first player of a computer simulation comprising the AV stream. In such embodiments, the instructions also are executable to provide second metadata corresponding to second non-audio, non-video sensory generation information in the AV stream for playback of non-audio, non-video sensory signals demanded by the second non-audio, non-video sensory generation information on a second device associated with a second player of the computer simulation.

In another aspect, an audio video (AV) playback device includes at least one display, at least one speaker, and at least one processor configured with instructions to receive at least one AV stream. The instructions may be executed by the processor to identify metadata in the AV stream, correlate the metadata to demanded non-audio, non-video sensory playback, and present the AV stream along with the non-audio, non-video sensory playback.

In examples, the instructions can be executable to, prior to playing back the non-audio, non-video sensory playback associated with the metadata, transform the non-audio, non-video sensory playback to transformed playback based at least in part on at least one setting of the AV playback device. The instructions are executable in these embodiments to play back the transformed playback in lieu of the non-audio, non-video sensory playback. The at least one setting may include an accessibility setting.

In some embodiments, the instructions can be executable to load into memory at least one file associated with the non-audio, non-video sensory playback based at least in part on identifying a start of a chapter in the AV stream. In other embodiments the instructions are executable to load into memory at least one file associated with the non-audio, non-video sensory playback based at least in part on identifying a player of a computer simulation arriving within a distance of a haptic event.

In example implementations, the instructions may be executable to present on the display a first code that can be imaged by a first device associated with a first player of a computer simulation for correlation of the first code to first demanded non-video, non-audio sensory signals for presentation of first demanded non-video, non-audio sensory playback on the first device in concert with the AV stream. The instructions further may be executable to present on the display a second code that can be imaged by a second device associated with a second player of a computer simulation for correlation of the second code to second demanded non-video, non-audio sensory signals for presentation of second demanded non-video, non-audio sensory playback on the second device in concert with the AV stream.

In another aspect, a method includes associating metadata with non-video, non-audio sensory playback information that can be used by a computer to generate non-audio sensory playback signals. The method also includes embedding the metadata into an audio video (AV) stream.

The details of the present application, both as to its structure and operation, can best be understood in reference to the accompanying drawings, in which like reference numerals refer to like parts, and in which:

DETAILED DESCRIPTION

Figure 1:
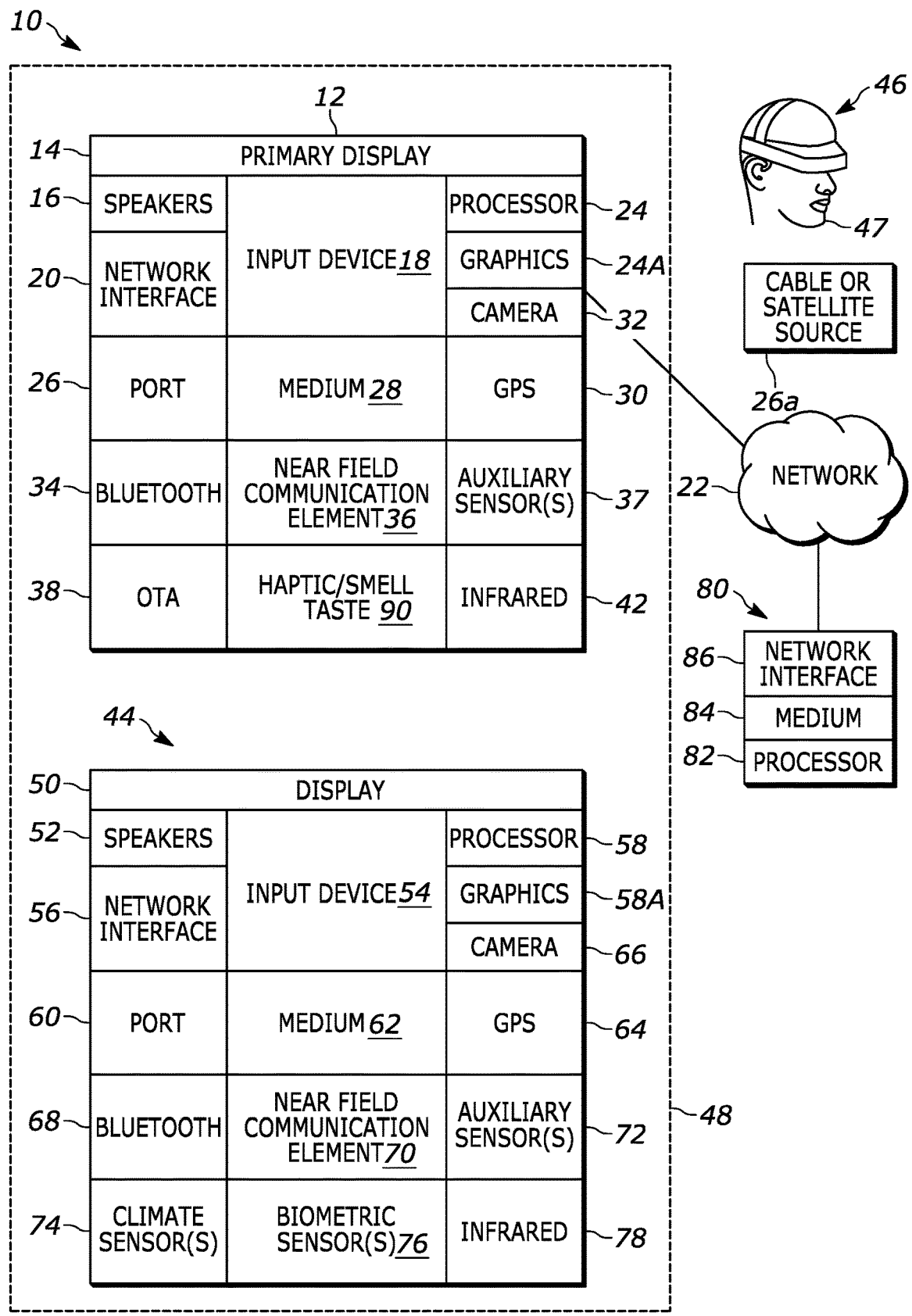
FIG. 1 is a block diagram of an example system including an example in accordance with present principles.

This disclosure relates generally to computer ecosystems including aspects of consumer electronics (CE) device networks such as but not limited to computer simulation networks such as computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12, as an example of a multiuser voice chat system.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

As set forth in greater detail below, any of the devices herein, such as the AVD 12, may include one or more of a haptic generator, a scent generator, a taste generator, and/or other generators such as mist generators, wind generators, etc., indicated by reference numeral 90 in FIG. 1.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
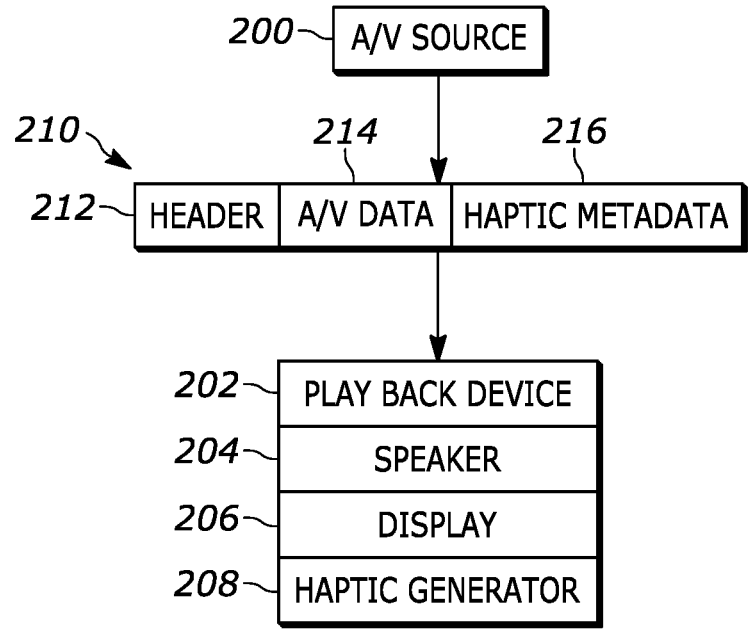
FIG. 2 is a block diagram of an example data structure showing haptic metadata embedded in an audio-video (AV) stream provided by an AV source to an AV playback device.

FIG. 2 illustrates an AV playback system that also provides for sending haptic playback information from a source 200 of AV content to a playback device 202. In this way, previously recorded video can be spectated during playback without losing whatever haptic experiences may have been generated for original playback without having to rely on merely deriving haptic events from audio.

The source 200 and playback device 202 may incorporate any of the components described above. The source 200 may be a network source for providing content to the playback device 202 over the Internet ("cloud") or it may be a local source of content such as a disk or other storage local to the playback device 202.

In the example shown, the playback device 202, which may be implemented without limitation by the VR headset 46 in FIG. 1, may include one or more speakers 204 for playing demanded audio and one or more displays 206 for presenting demanded video. The playback device also may include one or more haptic generators 208 for generating demanded tactile signals. Or, the haptic re-rendering may be executed entirely by a computer simulation controller. For instance, a DualShock® 4 game controller may be synchronized in time with playback of audio-video on the screen and speakers of a display device such as a TV, with the controller executing haptic downloading and haptic playback.

An AV data stream 210 may be sent from the AV source 200 to the playback device 202 using data packets, an example of which appears in FIG. 2. A data packet may include a packet header 212 for the particular protocol being used to transmit the AV stream 210 and AV data 214. The packet also may include haptic metadata 216 for purposes to be shortly disclosed.

It is to be understood that while haptic metadata is discussed in relation to FIG. 2, in addition or alternatively scent metadata and touch metadata may be similarly conveyed for causing the playback device 202 to generate demanded scents and/or tastes as discussed further below.

Figure 3:
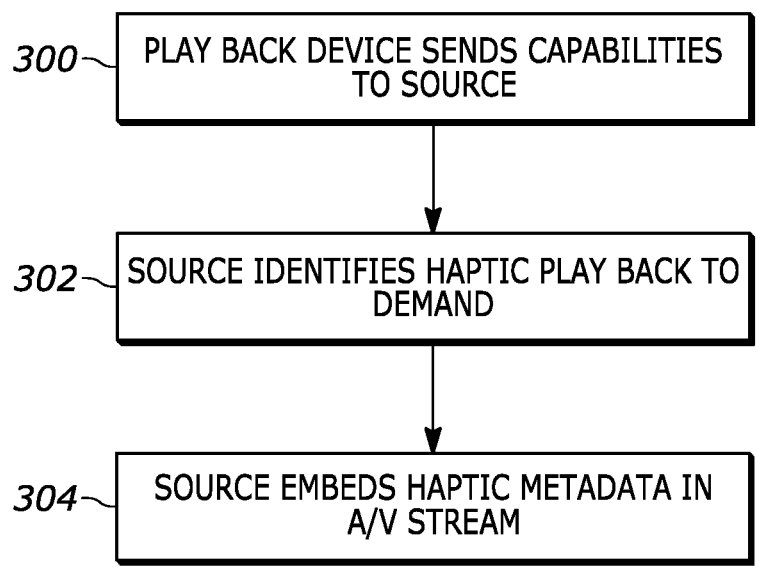
FIG. 3 is a flow chart of example logic consistent with FIG. 2.

FIG. 3 illustrates logic attendant to the system of FIG. 2. At block 300 the playback device 202 may send information pertaining to the playback capabilities of the playback device 202 to the source 200. This may be done using secure socket layer (SSL) signaling.

Moving to block 302, the source 200 may correlate the capabilities of the playback device 300 to available demanded haptic signals, such that one playback device with first capabilities may be correlated to a first set of demanded haptic signals while a second playback device with second capabilities may be correlated to a second set of demanded haptic signals, with both sets of haptic signals be associated with the same AV program provided to both playback devices.

As an example, demanded haptic events may be transformed into simplified versions depending on the capabilities of the playback device, such that an original demanded haptic event demanding relative complex haptic generators may be transformed to simply "low" or "high" vibration frequency or intensity when the playback device has only simple haptic generators.

Metadata indicating the demanded haptic signals from block 302 as well as when in the AV stream the haptic signals are to be played back is embedded in the AV stream at block 304. Alternatively, a data stream that is separate from the AV stream with haptic metadata may be sent in parallel with the AV stream to indicate time codes to synchronize playback of the haptic signals demanded by the haptic metadata with playback of audio and video.

Figure 4:
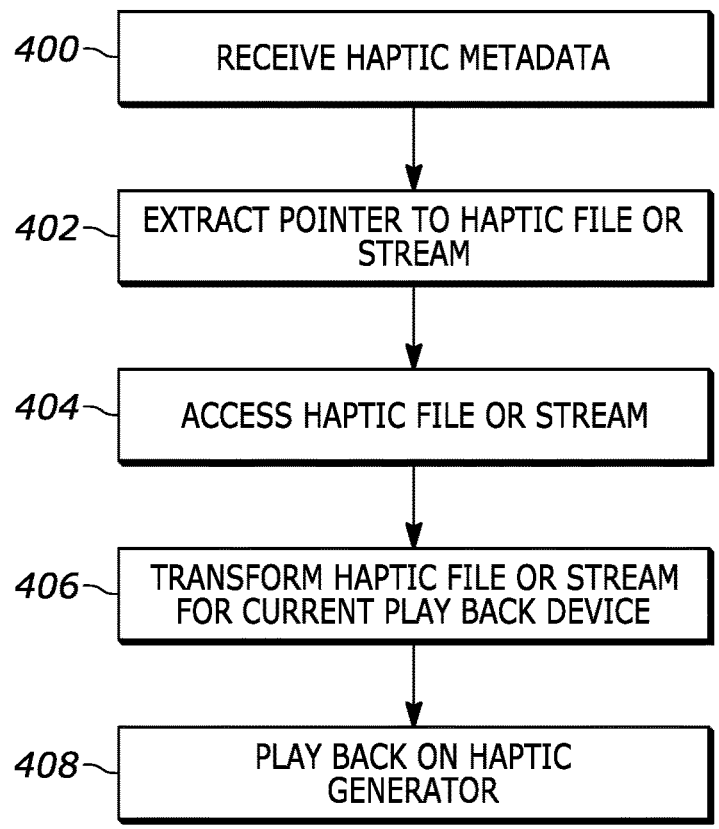
FIG. 4 is a flow chart of example playback logic.

FIG. 4 illustrates example logic that may be employed by the playback device 202. Commencing at block 400, the haptic metadata is received in the AV stream. The metadata may point to a haptic playback file or stream by file name, network address, or other identifier, and the pointer is extracted at block 402 by a haptic decoder and used to access the haptic playback file or stream at block 404.

If desired, the logic may move to block 406 to transform the haptic signals in the file or stream as appropriate for the current configuration of the playback device 202. For example, if the playback device 202 lacks haptic generators, the haptic signals may be transformed to video alphanumeric characters indicating the type of demanded haptic event, e.g., "explosion" for presentation on the display 206 and/or speakers 204. The demanded haptic signals are played back at block 408 at the times indicated in the haptic metadata. Further, access rights as well as capability may dictate provisioning of haptic (and taste/scent/etc.) information. For instance, haptic sources may be restricted for profit, for fairness, or for some other reason. They could be encrypted through a digital rights management (DRM) mechanism or only selectively inserted into the stream.

Figure 5:
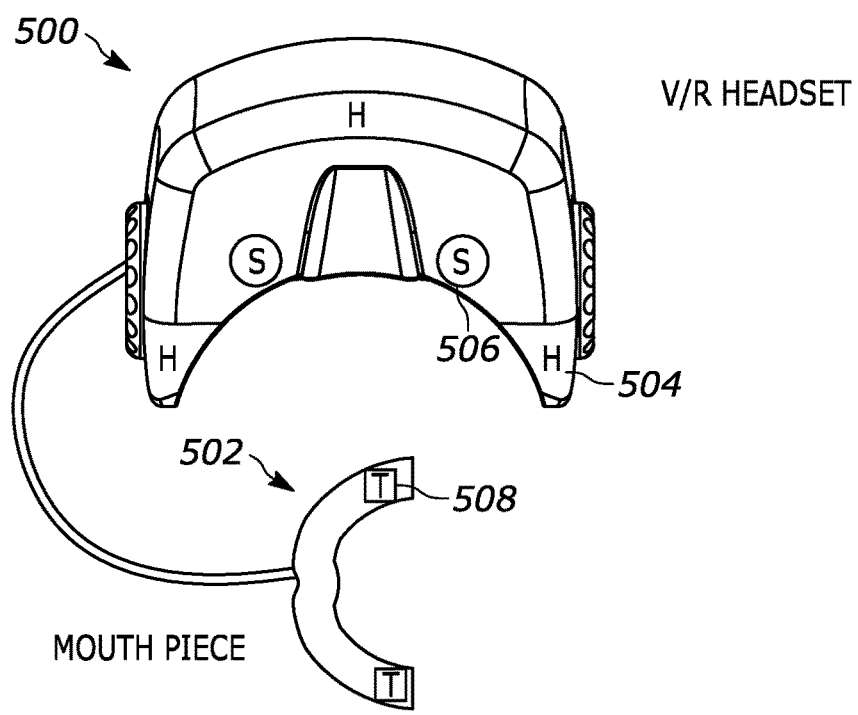
FIG. 5 is a schematic diagram of a headset with haptic and scent generators and an associated mouthpiece with taste generators.

FIG. 5 illustrates an example playback device that include a head-mounted display (HMD) 500 and a mouthpiece 502 that may be in communication with the HMD 500. In the example shown, in addition to appropriate components from FIG. 1, the HMD 500 may include one or more haptic generators 504 that can be actuated to generate demanded haptic signals and one or more scent generators 506 that can be actuated to generate demanded scents. A scent generator 506 may be implemented as discussed in U.S. Pat. No. 10,156,908 owned by the same assignee as the instant application and incorporated herein by reference or as discussed in U.S. Pat. No. 10,258,712, also incorporated herein by reference.

The mouthpiece 502 may include one or more taste generators 508 that can be actuated to generate demanded taste, e.g., salty taste, bitter taste.

Figure 6:
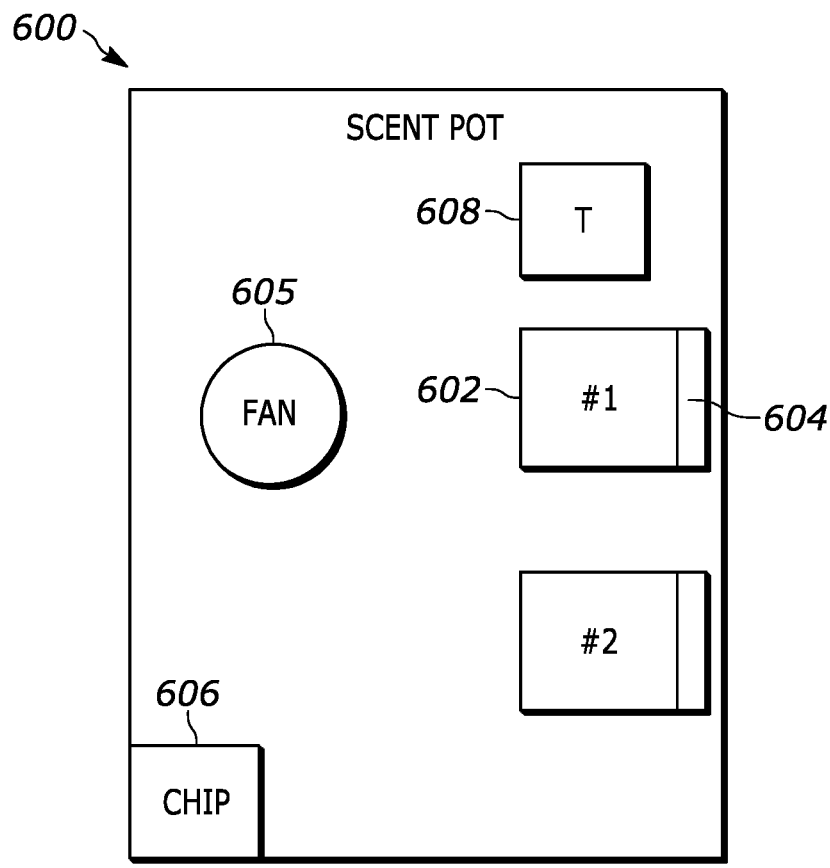
FIG. 6 is a schematic diagram of an example scent pot.

FIG. 6 illustrates yet another alternate scent or taste generator 600 that may be employed in FIG. 5. FIG. 6 assumes that the generator 600 may be implemented as a small scent pot in which multiple reservoirs 602 of different scent substances can be selectively exposed to the exterior of the scent pot, in some case wafted out of the scent pot by a fan 605, by opening a respective shutter 604. The scent pot also may include a chip 606 for communicating to a source of demanded scent or taste signals what scents/tastes are available in the scent pot. Note that if desired, the scent pot may include, in addition to scent capability, one or more temperature generators 608 such as thermoelectric coolers (TEC) and electric heaters that can be activated to generate cold or heat, which is wafted from the scent pot by the fan 605 to provide a tactile sensation of heat or cold.

Figure 7:
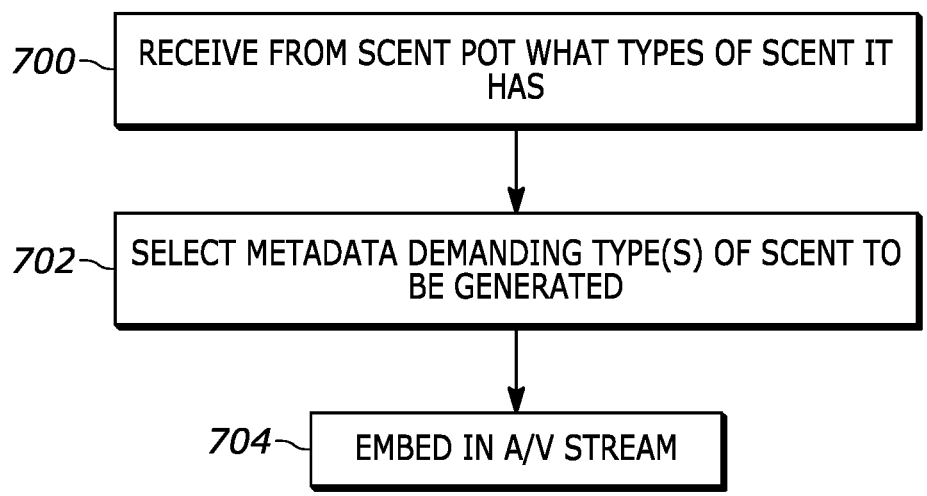
FIG. 7 is a flow chart of example logic consistent with FIG. 6.

FIG. 7 illustrates this last point further. Commencing at block 700, the source such as the AV source 200 in FIG. 2 receives from the chip 606 of the scent pot what types of scent are available in the scent pot. Moving to block 702, metadata is selected demanding types of scent that both best match originally demanded scent and the types of scent available in the scent pot in individual scent reservoirs 602 or that may be derived from a mixture of scents available in the scent pot. The metadata associated with the determined demanded scent at block 702, potentially modified from the original demanded scent, is embedded into the AV stream at block 704.

Figure 8:
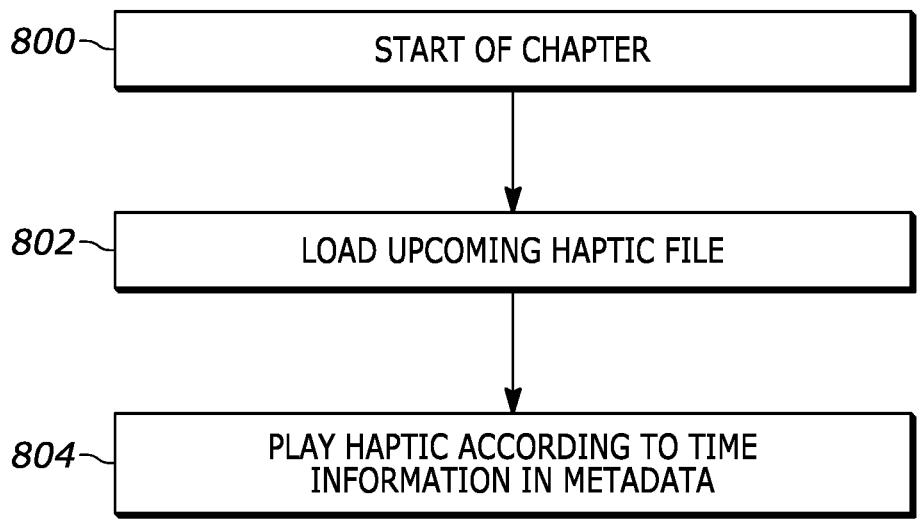
FIG. 8 is a flow chart of example logic for pre-loading haptic playback files at the start of a video chapter.
Figure 9:
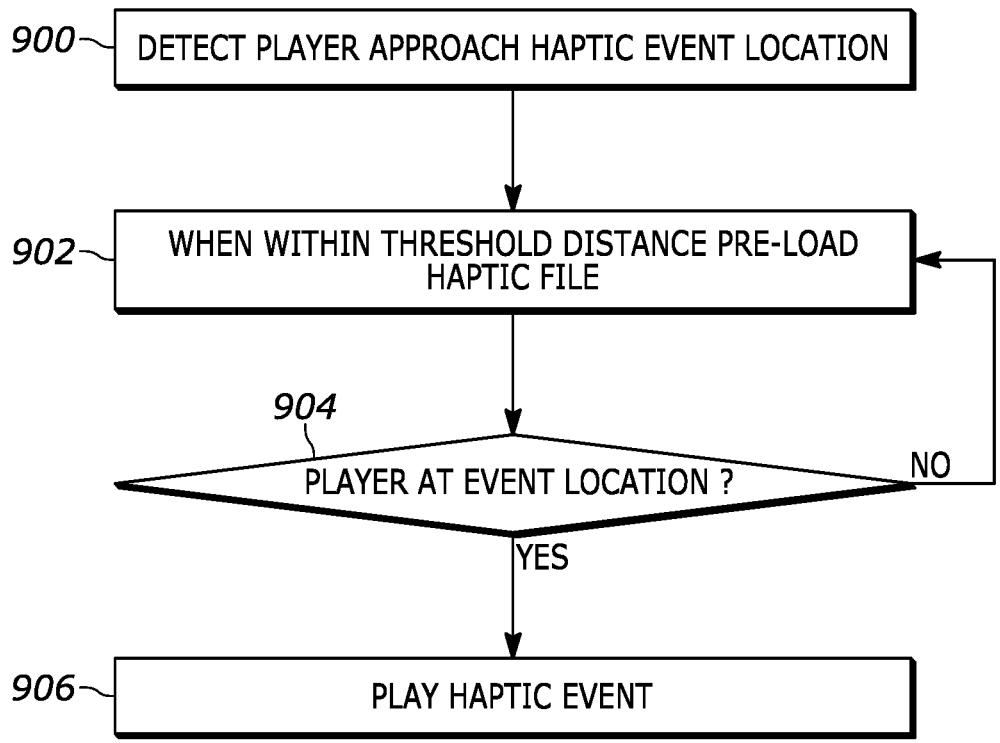
FIG. 9 is a flow chart of example logic for pre-loading haptic playback files depending on player movement in a virtual environment.

Recognizing that the haptic (or scent or taste) metadata may point to relatively large files, FIGS. 8 and 9 illustrate techniques to preload the demanded files only upon impending playback. Commencing at block 800 in FIG. 8, the start of a new chapter is identified, causing the logic to move to block 802 to scan ahead in the video stream to locate haptic metadata and upload into playback memory haptic files pointed to by the metadata. The haptic files are played back at block 804 according to the time for playback information in the metadata.

In contrast, FIG. 9 illustrates that at block 900, a player, either a real player or a virtual player, is identified as approaching a location in a computer simulation such as a computer game at which a haptic event is programmed to occur. In anticipation of the player arriving within a threshold of the location at block 902, the haptic file(s) associated with the event are preloaded into memory. If it is determined that the player reaches the location of the haptic event at decision diamond 904, the event is played at block 906. Otherwise, the event is not played, e.g., in the case that the player turns away from the location of the event. The threshold may be a distance as described or it may be temporal, e.g., a game character may remain in place in the simulation but will receive a certain haptic signal in several seconds.

Figure 10:
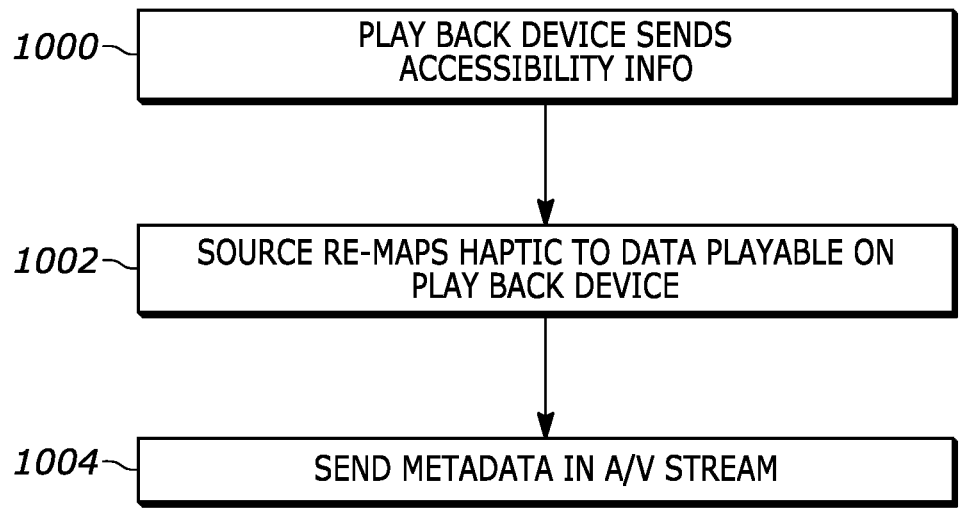
FIG. 10 is a flow chart of example logic for re-mapping demanded haptic signals based on accessibility information.
Figure 11:
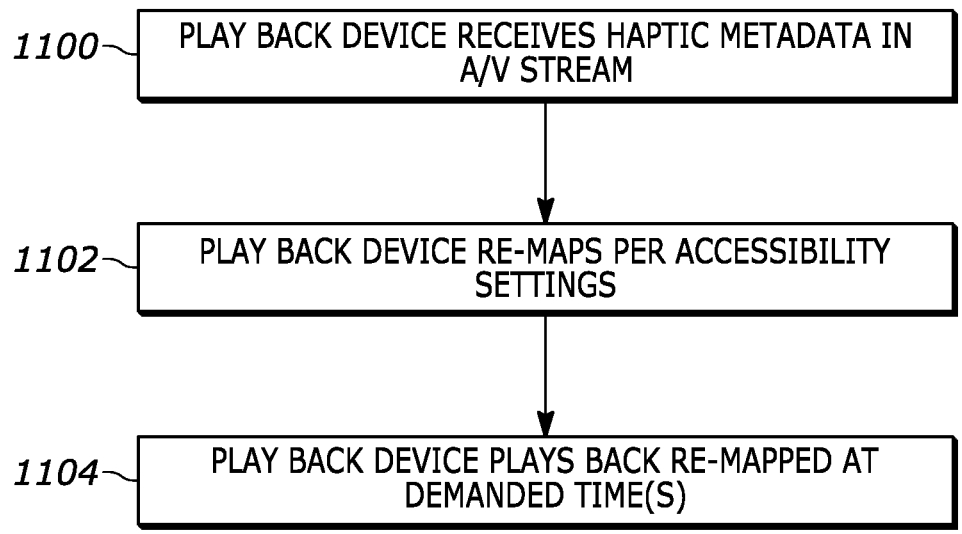
FIG. 11 is a flow chart of alternate example logic for re-mapping demanded haptic signals based on accessibility information.

FIGS. 10 and 11 illustrate techniques for remapping originally demanded haptic signals based on accessibility settings or capabilities of the playback device to account for the particular player. As indicated above, this remapping may be executed during negotiation between the source and playback device to send customized mapping, with haptic signals potentially being mapped to visual or audible equivalents when, for example, a player may not have use of her hands.

Commencing at block 1000 in FIG. 10, the playback device may send to the source indication of accessibility contained in accessibility information. Moving to block 1002, the source remaps originally demanded haptic to data that is playable on the playback device consistent with the accessibility information. Metadata associated with the remapped haptic is embedded in the AV stream at block 1004 so that the playback device can extract the metadata and play back the remapped haptic according to the accessibility of the player. Note that the remapping at block 1002 may be executed by the playback device or by a third component from another source.

FIG. 11 illustrates an alternate technique in which the playback device at block 1100 receives from the source haptic metadata indicated originally demanded haptic playback. The playback device remaps the originally demanded haptic at block 1102 consistent with principles above in accordance with the accessibility settings of the playback device, which may be defined by the player. The playback device at block 1104 plays back the remapped haptic at the times demanded.

Figure 12:
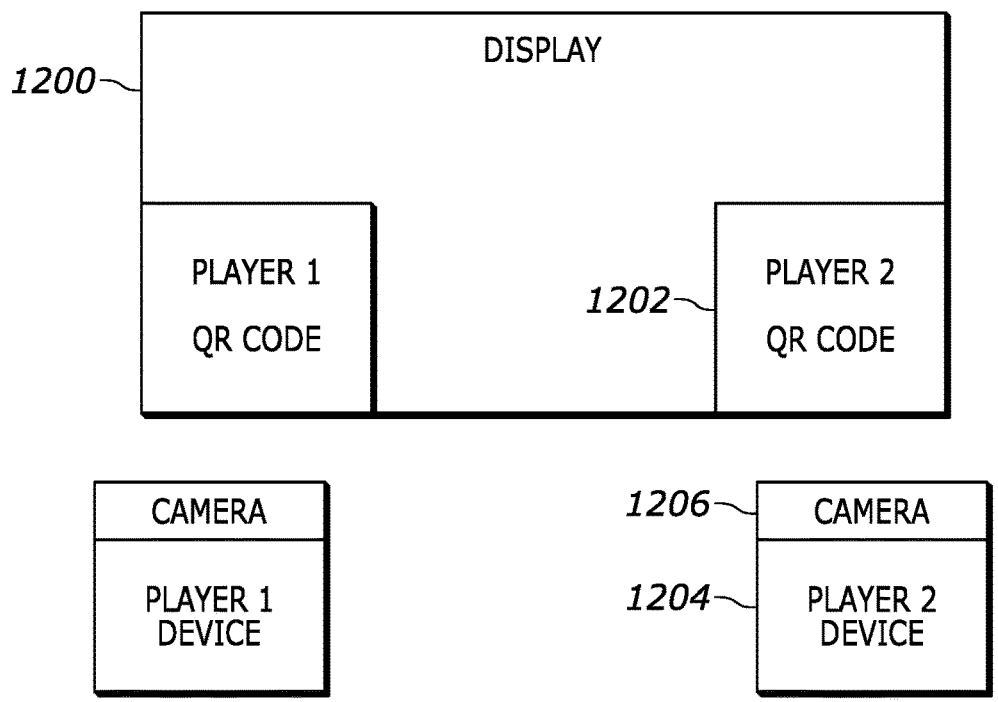
FIG. 12 is a schematic diagram illustrating provisioning separate haptic information to plural player devices.
Figure 13:
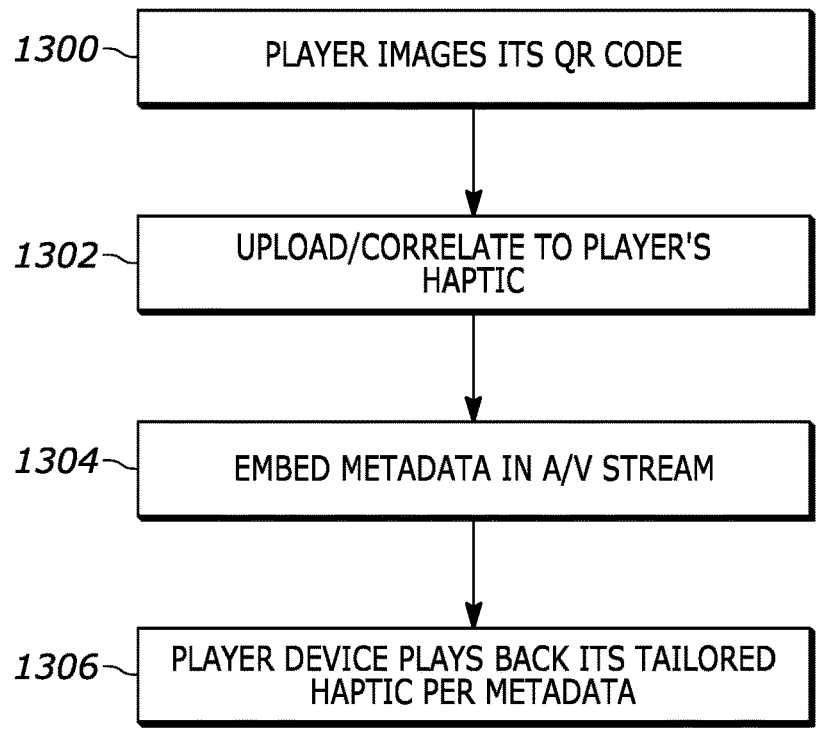
FIG. 13 is a flow chart of example logic consistent with FIG. 12.

FIGS. 12 and 13 illustrate haptic personalization for multiple users, e.g., based on the game characters being played by each player, who typically hold their own respective playback devices. In FIG. 12, a display 1200 may present codes 1202 such as quick response (QR) codes for each of multiple players of a computer simulation being presented on the display 1200. Each player may hold his or her own player device 1204 such as a headset and/or game controller with a camera 1206 that can image the code 1202 associated with the player. Note that the codes may be transmitted over the network or embedded in an audio (or haptic) stream.

This imaging is executed at block 1300 in FIG. 13. The code is uploaded to the simulation server at block 1302 for correlation to a series of demanded haptic signals for the player associated with the code, or the player device 1204 may correlate the imaged code itself. Block 1304 indicates that haptic metadata for each player is embedded in the AV stream for provisioning of the demanded haptic files to the respective player devices 1204 at block 1306, such that the first player device 1204 can play back different haptic signals than are played back by the second player device 1204.

It will be appreciated that whilst present principals have been described with reference to some example embodiments, these are not intended to be limiting, and that various alternative arrangements may be used to implement the subject matter claimed herein.

What is claimed is:

1. A device comprising:
   at least one computer memory that is not a transitory signal and that comprises instructions executable by at least one processor to:
   associate metadata with non-audio, non-video sensory generation information;
   provide the metadata and provide packets of an audio video (AV) stream such that the AV stream can be recorded along with the metadata and played back to cause a play back apparatus to use the metadata to retrieve the associated non-audio, non-video sensory generation information and generate signals as demanded by the non-audio, non-video sensory generation information during play back of the AV stream;
   receive accessibility information associated with the playback device; and
   responsive to the accessibility information, remap first non-audio, non-video sensory generation information to second sensory generation information for playback of sensory signals as demanded by the second sensory generation information, the metadata being associated with the second sensory generation information.

2. The device of claim 1, wherein the device is implemented by at least one network server.

3. The device of claim 1, wherein the device is implemented by a device in a local area network with the playback device and/or by a storage device.

4. The device of claim 1, wherein the non-audio, non-video sensory generation information comprises haptic information.

5. The device of claim 1, wherein the non-audio, non-video sensory generation information comprises scent information.

6. The device of claim 1, wherein the non-audio, non-video sensory generation information comprises taste information.

7. The device of claim 1, wherein the instructions are executable to:
   identify the non-audio, non-video sensory generation information based at least in part on capability information received from the playback device.

8. A device comprising:
   at least one computer memory that is not a transitory signal and that comprises instructions executable by at least one processor to:

associate metadata with non-audio, non-video sensory generation information;

provide the metadata and provide packets of an audio video (AV) stream such that the AV stream can be recorded along with the metadata and played back to cause a play back apparatus to use the metadata to retrieve the associated non-audio, non-video sensory generation information and generate signals as demanded by the non-audio, non-video sensory generation information during play back of the AV stream;

provide first metadata corresponding to first non-audio, non-video sensory generation information in the AV stream for playback of non-audio, non-video sensory signals demanded by the first non-audio, non-video sensory generation information on a first device associated with a first player of a computer simulation comprising the AV stream; and provide second metadata corresponding to second non-audio, non-video sensory generation information in the AV stream for playback of non-audio, non-video sensory signals demanded by the second non-audio, non-video sensory generation information on a second device associated with a second player of the computer simulation.

9. A device comprising:

at least one processor configured with instructions to:

receive at least one AV stream;

identify metadata in the AV stream;

correlate the metadata to demanded non-audio, non-video sensory playback;

present the AV stream along with non-audio, non-video sensory playback;

prior to playing back non-audio, non-video sensory playback associated with the metadata, transform the non-audio, non-video sensory playback to transformed playback based at least in part on at least one setting of the AV playback device; and play back the transformed playback in lieu of the non-audio, non-video sensory playback.

10. The device of claim 9, wherein the non-audio, non-video sensory playback comprises haptic playback.

11. The device of claim 9, wherein the non-audio, non-video sensory playback comprises scent playback.

12. The device of claim 9, wherein the non-audio, non-video sensory playback comprises taste playback.

13. The device of claim 9, wherein the at least one setting comprises an accessibility setting.

14. The device of claim 9, wherein the instructions are executable to:

load into memory at least one file associated with the non-audio, non-video sensory playback based at least in part on identifying a start of a chapter in the AV stream.

15. The device of claim 9, wherein the instructions are executable to:

load into memory at least one file associated with the non-audio, non-video sensory playback based at least in part on identifying a player of a computer simulation arriving within a space or time distance of a haptic event.

16. A device comprising:

at least one processor configured with instructions to:

receive at least one AV stream;

identify metadata in the AV stream;

correlate the metadata to demanded non-audio, non-video sensory playback;

present the AV stream along with non-audio, non-video sensory playback;

present on the display a first code that can be imaged by a first device associated with a first player of a computer simulation for correlation of the first code to first demanded non-video, non-audio sensory signals for presentation of first demanded non-video, non-audio sensory playback on the first device in concert with the AV stream; and present on the display a second code that can be imaged by a second device associated with a second player of a computer simulation for correlation of the second code to second demanded non-video, non-audio sensory signals for presentation of second demanded non-video, non-audio sensory playback on the second device in concert with the AV stream.

* * * * *